(12) United States Patent
Nunamaker

(10) Patent No.: US 8,882,509 B1
(45) Date of Patent: Nov. 11, 2014

(54) METHOD AND KIT FOR TEACHING FINANCIAL LITERACY AND CIVIC ENGAGEMENT

(76) Inventor: Susan R. Nunamaker, Seneca, SC (US)

( * ) Notice: Subject to any disclaimer, the term of this patent is extended or adjusted under 35 U.S.C. 154(b) by 0 days.

(21) Appl. No.: 13/596,035

(22) Filed: Aug. 27, 2012

Related U.S. Application Data

(60) Provisional application No. 61/529,292, filed on Aug. 31, 2011.

(51) Int. Cl.
  *G09B 19/18* (2006.01)
(52) U.S. Cl.
  USPC .......................................................... 434/107
(58) Field of Classification Search
  USPC ................ 434/107, 108, 109, 219, 236, 238; 273/278, 297, 302
  See application file for complete search history.

(56) References Cited

U.S. PATENT DOCUMENTS

| | | | | |
|---|---|---|---|---|
| 2,904,899 A * | 9/1959 | Lloyd | ............................ | 434/109 |
| 4,109,918 A * | 8/1978 | Mele et al. | .................... | 273/256 |
| 5,230,627 A * | 7/1993 | Todd | ............................. | 434/109 |
| 5,429,373 A * | 7/1995 | Chelko et al. | ................. | 273/440 |
| 5,573,404 A * | 11/1996 | Stawski, II | .................... | 434/238 |
| 5,725,381 A * | 3/1998 | Kollath et al. | ................ | 434/238 |
| 6,032,957 A * | 3/2000 | Kiyosaki et al. | .............. | 273/256 |
| 6,106,300 A * | 8/2000 | Kiyosaki et al. | .............. | 434/107 |
| 6,544,037 B2 * | 4/2003 | Fink | ............................. | 434/162 |
| 6,709,330 B1 * | 3/2004 | Klein et al. | ....................... | 463/9 |
| 6,729,884 B1 * | 5/2004 | Kelton et al. | ................. | 434/236 |
| 6,764,077 B1 * | 7/2004 | Miravete | ....................... | 273/256 |
| 6,767,210 B2 * | 7/2004 | Joffe | ............................ | 434/107 |
| 7,914,286 B2 * | 3/2011 | Lees | ............................ | 434/107 |
| 8,118,598 B2 * | 2/2012 | Rogan et al. | .................. | 434/107 |
| 8,480,399 B2 * | 7/2013 | Koreny | ........................ | 434/128 |

* cited by examiner

*Primary Examiner* — Kurt Fernstrom

(57) ABSTRACT

The present invention relates to methods and materials, particularly in kit form, associated therewith for imparting civic responsibility and financial literacy within an educational setting. The present invention more particularly relates to methods of teaching via implementation of a teacher-guided, student-selected free market economy, including teacher run and student run businesses, and accompanying representative government, including a peer court system.

3 Claims, No Drawings

METHOD AND KIT FOR TEACHING FINANCIAL LITERACY AND CIVIC ENGAGEMENT

CROSS-REFERENCE TO RELATED APPLICATIONS

This application claims priority to U.S. provisional patent application No. 61/529,292, filed Aug. 31, 2011, which is hereby incorporated by reference herein in its entirety.

FIELD OF THE INVENTION

The present invention relates to methods and materials, particularly in kit form, associated therewith for imparting civic responsibility and financial literacy within an educational setting. The present invention more particularly relates to methods of teaching via implementation of a teacher-guided, student-selected free market economy and accompanying representative government.

BACKGROUND OF THE INVENTION

There is a need in the art for greater financial literacy and civic engagement within the general population. To encourage greater financial literacy, a non-profit group, the Jumpstart Coalition for Personal Financial Literacy, developed National Financial Literacy Standards for Kindergarten through $12^{th}$ grade. Less than half the states have financial standards which are approved by the Jumpstart Coalition. In response, the Federal Government set up a Financial Literacy and Education Commission under the Financial Literacy and Education Improvement Act of 2003, which promulgated a National Strategy for Financial Literacy in 2011. During the course of the government's study, teachers were surveyed, and more than half of American teachers feel unqualified to teach financial education standards. In addition, the US Treasury has formed an Office of Financial Education. Unfortunately, although there is strong governmental interest in financial education, there remains a severe need in the art for education materials and methods by which teachers may impart financial education.

SUMMARY OF ADVANTAGEOUS EMBODIMENTS OF THE INVENTION

Applicant has developed a total-immersion program in which students role-play within the confines of a free market economy and representative government. Applicant has found that student attendance has improved greatly through the implementation of greater class self-governance, student-responsibility and student-entrepreneurship. Applicant further hypothesizes that improved test scores will be associated with such improved student attendance. In addition, the inventive teaching methods provide a fresh paradigm that reenergizes teachers who have been educating for many years using conventional teaching methodologies.

The inventive teaching methods generally involve immersing the class in a free market economy and representative government through ongoing daily role play and shared decision-making within a well-defined, yet flexible framework. The free market economy includes student participation in class-based jobs generated by the teacher, as well as student-based jobs created by individual students. Student-based jobs require an individual student to initially submit a business plan for review by the teacher and to obtain a license to sell a particular product or service of his/her choosing, using either their desk or further classroom space rented from the teacher as a student-store. Class-money is used to provide a salary for class-based jobs, which may then be used to pay expenses, such as rent for or purchase of the student's desk and cubby space, insurance, fines for poor behavior and the like. Surplus class-money may then be used by the student to purchase goods and/or services from either a teacher-sponsored class-store or from student-vendors in student-stores. The student-vendors are responsible for all aspects of their business, including promotion, transactions and production.

In addition, the program provides a student-run banking system providing checking accounts with optional debit cards and optional credit cards for students having surplus class-money. To obtain a credit card, students must submit an application for the credit card which is granted after a review of their financial history. The credit limit granted is based upon a pre-determined fixed scale and is subject to a finance fee on remaining balances.

Students may further choose to invest their surplus class-money in class-stocks, involving greater financial risk and higher monetary returns, and/or class-bonds, involving lower financial risk and more moderate monetary returns. To invest in stocks a student selects a card from a stack of pre-printed "stock" cards that randomly indicate that the student is entitled to either a certain student-money loss or gain, and the student receives the same. Similarly, a student selects a card from a stack of pre-printed "bond" cards that randomly indicate that the student is entitled to either a certain student-money loss or gain, and the student receives the same.

The program further includes a life planning component by randomly selecting a student at an undetermined interval to choose card that simulates either a financial set-back or a financial gain that is subsequently deducted from or paid to the student with class-money.

The program additionally optionally allows students to purchase insurance and wills with any surplus class-money that they may have. The program is designed to provide a tremendous amount of flexibility in allowing the student to decide now to dispose of his/her surplus class-money, so that the effect of various choices may be readily determined over the course of the year.

The inventive teaching methods also encourage a high degree of civic engagement. The program provides an avenue by which grievances may be addressed and class-policies developed or modified through a representative student-run government. Students initially prepare a campaign application to become a candidate. Class elections are then held to select a governing body, generally including a governor, lieutenant governor, senators, representatives, attorney general and mayor, each of which may be impeached by the class for poor performance. The inventive methods hold meetings, such as town hall meetings, in which a student may air grievances to the governing body. The governing body subsequently proposes a response to the grievance, which is presented to the teacher for authorization. Upon teacher authorization, the response, such as the formation of a specific student-run committee or student-run program, is then communicated to the student.

The present program additionally promotes community awareness and the development of community services. For example, the inventive teaching methods encourage the formation of student-organizations providing community services for the benefit of the class that is run by students using items purchased from the class-store and/or student-store(s).

The instant invention further provides a peer-based behavioral management system. The behavioral management system includes a list presented to the students of behavior levels and corresponding consequences for the class, including fines to be deducted from a student's salary for poor behavior or the like. For particularly egregious behavior, the student may be subjected to a mock-trial within a peer court comprising the selection of a prosecutor (or use of previously elected Attorney General), defense attorney, and jury foreman, with the remainder of the class to serve as a jury. The mock trial, in which the teacher serves as judge, includes student testimony and cross-examination. The jury subsequently renders a verdict, which may include participation in a student-run seminar or the like. The student must then comply with the verdict and draft a note explaining the egregious behavior for signature by his/her parent.

The methods and materials described herein may be readily applied within either a conventional classroom setting or during home schooling. In addition, the inventive methods may be tailored for use by parents in the home.

It is further envisioned that additional elements may be incorporated into the inventive teaching methods and kits, including elements directed to advertising, marketing, visual arts, language arts, science and technology. Particularly, it is further envisioned that student vendors may readily use advertising, marketing, visual arts, language art, science and technology modules to promote, create and improve items for sale within student-stores.

DETAILED DESCRIPTION OF ADVANTAGEOUS EMBODIMENTS OF THE INVENTION

The present invention thus provides a behavioral and financial citizenship system, advantageously in kit form, to aid in the classroom or home instruction of children. The inventive system, expediently in kit form, generally comprises one or more of a motivational behavior chart consisting of a plurality of levels ranging from poor behavior to excellent behavior, class money of various denominations provided in a set, an optional employment board, class fines and fees poster, a goal chart consisting of a plurality of academic disciplines, student wallets, play debit cards, play credit cards, play checks, play identification cards, optional play insurance cards, optional play insurance stickers, life consequence scenario cards, play stock cards, and play bond cards, lottery tickets, stuffed animal and diary for same, and flat sticks on which to write student's names which are advantageously provided within a single unit or kit. The inventive systems, expediently in kit form, further advantageously include one or more of a classroom rules and procedures contract for signature by the student's parents, generally describing the rules and regulations associated with the incentive system, along with forms for wills and testaments, forms for excellent student behavior, forms for worst student behavior (i.e. "Peer Court" form letter to parents), employment application form, credit card application form, optional check forms, optional deposit slip forms, bank transaction book, personal-area owner verification forms, election candidate forms, candidate parent letter from, voter registration forms, voting ballot forms, student ID badge forms, student business license forms, student business parent letter forms, and financial knowledge assessment forms. Any or all of the foregoing contracts, forms and the like may be provided either in paper form or on any appropriate electronic storage media, such as a CD or jump drive or the like. In addition, the inventive kits further preferably comprise a teacher's guide for classroom implementation and/or a training video. The teacher's guide for classroom implementation describes the inventive methods and materials discussed herein in detail, including the provision of exemplary forms and the like. The training video illustrates one or more of the elements of the inventive methods, including one or more of various aspects of forming and participating in a class-based free market economy, participating in civic engagement through formation and participation in a class government, and forming and participating in a behavioral management system.

As used herein the term "play", e.g. "play money", "play debit card", "play credit card" and the like, refers to items that are reminiscent of legitimate items, such as legitimate currency or other legal documents, yet are sufficiently noticeably fake to be suitable for use as toy currency or the like in classroom or home instruction. As used herein, the term "kit" or "teaching kit" refers to a collection of components used to convey financial literacy, civic engagement and behavioral modification. As used herein, the term "children" and "student" may be used interchangeably. As used herein the terms "form" and "application" refer to documents with blanks for the insertion of details or information regarding a particular subject matter. As used herein the term "card" refers either to (i) an entire or piece of card stock, also called cover stock or pasteboard, which is a paper stock that is thicker and more durable than normal writing or printing paper, such us construction paper, particularly laminated construction paper, or (i) a plastic film or plastic film laminate having a generally rectangular shape with rounded corners, preferably having a size of about 85.60×53.98 mm (3.370×2.125 in) and rounded corners with a radius of 2.88-3.48 mm., in general accordance with the size of authentic payment cards, such as credit, debit or other cards. As used herein the term "student's name" means either a student's given name or a student identification ("ID") number assigned to each student at the beginning of the year by the teacher, unless expressly specified to the contrary or otherwise obvious from the context. In the inventive system, student identification cards may be issued at the beginning of the year that include, inter alia, the individual student's name and their individual identification number issued by the teacher for each student printed on a first (or front) side. The student identification card, i.e. "Student ID card", may further be printed on the back (or second or opposing) side with the words "INSURANCE".

The motivational behavior chart, also referred to as the behavior management chart, comprises (i) a plurality of behavior management cards, preferably formed from laminated construction paper, with a behavior level listed on each card along with the reward or consequence associated with that particular behavior level and (ii) individual student behavior cards, preferably formed from laminated construction paper, with each card bearing a student's name or a student identification number assigned to each student at the beginning of the year. The behavior management cards are secured to a wall or bulletin boards spaced at intervals, such as evenly spaced in a vertical line or column, so as to form a chart or graph-ordinate, such as a chart ranging from worst behavior (also called "peer court") to good behavior, to great behavior and to finally best (or "excellent") behavior. At the beginning of each day, each student's individual behavior card is placed next to the "great behavior" behavior management card. Subsequently, each student moves his or her individual student-behavior card up or down the column of behavior management cards based upon behavioral choices made by the student during the course of the day, with the card movement triggered at the discretion of the teacher. As used herein, the term "teacher" refers to any supervisor within a learning environment, including both educators, learning supervisors and parents.

For example, the student will move his or her card individual student-behavior card to a "worse" behavior level following a poor choice. Conversely, a student moves his or her individual student-behavior card to the best behavior level following an outstanding choice. In advantageous embodiments, seven behavioral levels are used. Non-limiting exemplary behavioral levels include: superb or "super duper" (=student made outstanding choices), great (=student made correct choices all day long), good (=student generally made good choices and only had one warning), fair (=student generally made good choices but had two warnings), poor (=student made some good choices, but had three warnings); very poor (=student tried to make poor choices, but had four to six warnings); peer court (=student made no good choices and had six or more warnings).

A non-limiting exemplary employment board comprises (i) a plurality classroom-employment labels, each bearing an individual "student job" or "student employment position" printed on its front face and (ii) individual student-employment cards, each bearing a student's name printed on its front face. Both the classroom-employment labels and the student-employment cards are advantageously formed from construction paper, particularly laminated construction paper. The classroom-employment labels are advantageously mounted on the front surface of a pocket, envelope or other container having an opening defined within their topmost surface such that a single student-employment card may be inserted therein. In preferred embodiments, the pocket is a library-card pocket, such as a 3" by 5" pocket formed from a heavy paperstock. The individual classroom-employment labels, each preferably mounted onto an individual pocket or the like, may further be mounted onto a bulletin board, poster board or the like, preferably with the bulletin board or poster board bearing a title reflective of the board's purpose, such as "Classroom Jobs" or the like. Student employment cards are preferably formed from laminated construction paper or a flat stick, such as a tongue depressor or the like, onto which an individual student's name is printed.

Classroom jobs are typically distributed weekly, such as at the beginning of each instructional week. Students may be selected by the teacher or designated helper for the various student employment positions randomly, such as by drawing a student's name from a container or the like, or on a "first-requested, first-served" basis, e.g. by a show of hands. Alternatively, students may apply for specific positions using an Employment Application Form or the like. The teacher or designated helper then memorializes the distributed classroom employment positions for a given instructional period by placing individual student employment cards of the student selected in the proximity of their class-room employment label, such as within the pocket to which the class-room employment label is affixed. The individual student employment cards are typically removed from the employment board at the end of the instructional week. In advantageous embodiments, each student fills out a generalized Employment Application at least once a school year, describing the student's ideal job, the level of education required, the salary the student believes the job pays, why the student wishes the job, references, previous job history, and reasons the student deserves to hold a classroom job. In addition, the teacher may require the students to sign a student-contract stating that the student will responsibly discharge the duties associated with his/her classroom employment position for the instructional week it is assigned.

Classroom employment positions are to be referred to utilizing authentic, real-life vocabulary. For example, the typical "plant helper" should be referred to as "botanist" within this system. The teacher provides a general employment application for students to complete at the beginning of the instructional period.

Non-limiting exemplary classroom employment positions include: classroom assistant(s) (=student(s) run errands when needed, including the daily delivery of office notes and lunch count); line executive (=student sets a good example for hallway behavior by leading the lines to and from the classroom in the halls); door manager (=student holds the door for classmates when entering/exiting through the doorways); bathroom monitor (=students monitor behavior inside the bathroom and report behavior to the teacher during group bathroom breaks); employment supervisor (=student ensures fair distribution of classroom jobs); employment assistant (=student assists employment supervisor during job distribution); germ eradicator (=student distributes hand sanitizer to peers before lunch and completes classroom cleanliness checks at random upon teacher request); attorney (=student represents defendants in peer court, if needed, for a pre-set fee, such as 3 times the weekly classroom salary); bank teller (=student makes change for students so that they may pay taxes and rent); calendar teacher (=student leads calendar instruction each morning); calendar assistant (=student assists the calendar teacher in preparation for calendar instruction each morning); editor (=student creates and leads class through editing an incorrect sentence or the like during calendar time each morning); tax collector (=student collects the weekly tax from peers during payroll disbursement); rent collector (=student collects weekly rent from peers during payroll disbursement); real estate broker (=student assists in purchasing "homes" in the classroom); super star benefits administrator (=student assists teacher with the distribution of daily rewards for students listed on the super-star list); patrol persons (=students serve as "security" during class store time); technology assistants (=students set up and take down student laptops each morning and afternoon); rewards coordinator; and botanist (=student monitors the sun and water needs of classroom plants). Students are allowed to take up to 2 weeks of paid vacation throughout the year. Students may become unemployed for acting irresponsibly when performing their employment duties. As indicated above, classroom employment positions include traditional classroom duties, such as bathroom monitor, in addition to role-playing positions, such as tax collector.

The teacher pays students utilizing classroom money on a regular basis, such as at the end of each instructional week, for the jobs that they held in the classroom the week before. Classroom pay is based upon the student's performance quality of their weekly classroom job, and may be lowered or increased based upon behavioral level. If a student is unemployed for any reason he/she will not be paid for his/her services the prior week. A student weekly salary is set at the beginning of the year, such as $10 (or other arbitrary amount), to be paid to the student for classroom employment positions and/or role-played employment positions in classroom money if the student performed their position satisfactorily and had no behavior issues the week before. Students are paid a lesser amount than their full salary, such as $5 (or other lesser amount determined by the teacher), if they had any behavior issues the week before and/or performed their classroom job poorly. The teacher may either choose to pay slightly lesser amounts of student salary for each behavior issue, or merely to pay the same reduced amount for any and all infractions up to "peer court" level behavior. Students may also be paid an amount above the set weekly student salary for exemplary behavior. In addition, the teacher may choose to send a note home to the student's parents, describing the particular exemplary behavior and further noting that the student was "super duper" or the like. A pad of such exemplary-student notes, in which the term "super duper" is prominently printed on the face of the note, along with blanks or spaces for the student's name and description of exemplary behavior, is advantageously provided within the inventive kits. In contrast, students are paid $0, i.e. they receive no student weekly salary, if they found themselves in "Peer Court" for behavior infractions the week before.

The students may use the classroom money disbursed to them to buy items from the classroom and/or student stores, buy insurance or to invest in stocks or bonds, after having paid taxes and rent (unless they have "purchased" their cubby) for the week as well as any outstanding classroom fines/fees, "life happens" event and the like.

In "life happens", the teacher will randomly announce that a "life happens card" will be drawn, and selects one or more students to draw from a deck of "life happens cards" based upon a show of hands, to correct behavioral issues within a particular student(s), or the like, The "life happens cards" have printed on one side events that reflect life-like financial scenarios resulting in the children either paying or receiving play money based on the scenario listed on the card they drew. The deck of "life happens cards" is held by the teacher so that the printed scenario is face down, i.e. the students cannot see the scenario when drawing the card. Non-limiting exemplary "life happens" scenarios printed upon the "life happens cards" include events such as "you just got $5 from your grandparent," "your child needs $5 for a field trip," "a tree just fell on your desk and takes $10 to repair," and the like. The "life happens" deck contains a plurality of "life happens" scenario cards, such as a dozen or more cards.

Stock cards and bond cards simulate the experience of purchasing stocks and bonds in an adult society.

Students keep their net earnings in individual student wallets provided at the beginning of the instructional year or a classroom checking account. In preferred embodiments, if a student chooses to give money to another student, then the "giving" student will be required to give the teacher all their money.

The invention was created as an approach to motivate positive student behaviors through total economic immersion within learning environments. Aspects of the invention program advantageously include: (a) provision of behavior management levels, preferably ranging from "Super Duper" to "Peer Court"; (b) optional provision of Super Star weekly reward system; (c) optional provision of measurable student goal setting; (d) optionally facilitating college prep homework; (e) optionally instilling formal handshaking skills; (f) optionally fostering caretaking skills; (g) instilling financial literacy by providing classroom employment; (h) facilitating an economic system that includes the deduction of rent and taxes (i) provision of classroom cash, class store and student store(s); (j) instilling financial literacy by introducing checking accounts that include checks, debit cards, and interest; (k) instilling financial literacy by introducing credit cards and credit limits; (l) instilling financial literacy by providing opportunities for "Home Ownership" and "Renting"; (m) optionally instilling financial literacy by introducing a lottery; (n) instilling financial literacy by introducing "Life Happens" and associated financial impact; (o) instilling financial literacy by introducing class fines and fees to be paid in classroom money; (p) instilling financial literacy by introducing student insurance (such as health, property, and/or car insurance); (q) instilling civic literacy by introducing Will and Testaments; (r) instilling civic literacy by introducing Non-Profit Organizations; (s) instilling civic literacy by introducing Charitable Giving; (t) instilling financial literacy by introducing stocks and bonds; (u) instilling civic literacy by introducing Class Government and (v) instilling financial literacy by facilitating student entrepreneurship, in which student run businesses earn classroom money.

The invention provides relevancy and purposeful learning for students by bringing a number of realistic and authentic experiences into the learning environment. The life lessons learned become a common thread linking core academic subject areas including, but not limited to, math, writing, reading, and social studies. The invention thus relates to a new and useful behavior modification system that allows students to practice financial responsibility in a multitude of environments. This invention imbeds financial literacy in the traditional learning experience through true-to-life fiscal situations. This invention is particularly useful in enabling a teacher to facilitate realistic and authentic learning experiences while modifying behavior to decrease negative behavior incidents in the learning environment.

The inventive behavior and financial citizenship system is generally performed within the learning environment by the student(s)' supervisor engaging in: (1) optional hand shaking with students; (2) provision of a behavioral chart; (3) formation of a peer court; (4) optional compilation of the names for the Super Star list, and further optionally rewarding the same; (5) optionally providing an employment application for students to complete at the beginning of the instructional period; (6) distributing classroom employment positions amongst the students once an instructional week. (7) paying students once an instructional week utilizing classroom money for the jobs that they held in the classroom the week before; (8) collecting taxes and rent from student renters utilizing classroom money once each instructional week; (9) providing students an opportunity to purchase their own "home", such as a desk and/or cubby, utilizing classroom money; (10) optionally facilitating students setting measurable goals at the beginning of each instructional week; (11) optionally introducing a stuffed-animal class pet into the learning environment; (12) optionally assigning College Prep Homework to the students one day a week; (13) providing an opportunity for students to apply for a classroom credit card; (14) providing students with the opportunity to open a classroom checking account; (15) creating fines and fees to deter undesirable student behaviors and levying the same; (16) setting up a classroom store where students can shop using classroom money that is open at least once a week; (17) optionally providing an auction for items in the classroom store; (18) optionally issuing classroom lottery tickets; (19) periodically playing a classroom stocks and bonds game; (20) periodically interjecting "Life Happens" events into the instructional day; (21) providing students the opportunity to purchase health, property, and/or car insurance for the classroom using classroom money; (22) providing an opportunity for students to donate to peers on the debt board; (23) optionally facilitating student formation of a classroom non-profit organization to be run with classroom tax money; (24) optionally guiding students in creating classroom wills; (25) facilitating the election and creation of a classroom government system; and (26) facilitating student owned and operated stores in the classroom.

In advantageous embodiments of the invention, the teacher will begin each instructional day by shaking hands with students as they enter the instructional environment in order to create an instant connection between the instructional supervisor and each student and establish a sense of professionalism within the learning environment.

The teacher mounts the motivational behavior chart to the wall at the beginning of the school year. Each morning, the teacher moves each student's individual behavior card to the second from best behaved category. Subsequently, each student moves his or her individual behavior card up or down the column of behavior management cards at the teacher's discretion based upon behavior choices made by the student during the course of the day. If a student moves their individual behavior card to the "peer court" level, then that student is referred to a classroom attorney and sent to peer court for judgment via a mock trial. The peer court typically includes a student judge, a prosecuting student attorney, a defending student attorney and a student jury, such as a student jury containing either a portion of the students (such as 3 to 6 students) or the remainder of the students within the class not participating in the peer court. In peer court, the student has an opportunity to state his/her case with the help of a student defending attorney (who the client must pay in classroom money for services, such as three times the student's weekly pay). The peer court prosecuting attorney may cross-examine, the defending and prosecuting attorneys may optionally provide closing arguments, the jury makes a final decision of guilty/not guilty, the jury foreman relays the verdict and the judge or teacher may assign consequences, preferably in written form, to be carried out by the offender if found guilty. Exemplary consequences include attending "Manners School," and the like. The peer court system and specific trials are operated with teacher guidance and/or supervision to ensure fairness. Children whose individual behavior card was moved to the peer court level do not receive a payment for their classroom employment during that week. In advantageous embodiments, the student whose individual behavior card was moved to peer court will write a behavior note to his or her parents, i.e. a Peer Court letter, explaining the poor choices that resulted in their being taken to peer court. In preferred aspects, this note should be signed by the parents and returned to the teacher the next school day.

In particularly advantageous embodiments, the supervisor teacher compiles the names of students who remained on the "good" or "best" behavior category on the motivational behavior chart, e.g. the "Great" and/or "Super Duper" category, for a significant span of time, usually one school week (e.g. Monday through Friday) to form the Super Star list. The teacher may then reward students whose names are placed on the Super Star list with a reward, presented either daily for a week or once per week. Non-limiting exemplary rewards include one or more of: (i) allowing the student to choose an item from the class store for free or (ii) allowing the student to wear his favorite hat in the classroom or (iii) allowing the student to wear socks or slippers in the classroom; (iv) allowing the student to go out first for recess or (v) allowing the student to write with their favorite pen from home.

Within the inventive system, the teacher provides an employment application for students to complete at the beginning of one or more instructional periods or merely at the beginning of each school year. The employment application generally includes the student's name and career to which the child aspires, along with one or more questions such as what the student believes the requirements for the job to be, what the salary for the job is, why that job was selected, list of references, statement on why the student deserves a classroom job and a list of previous positions (including classroom positions) that the student has held. The employment application may or may not indicate which classroom job the child prefers. The employment application is generally intended to focus the student's attention on the educational requirements for various careers, as well as salaries commensurate with various careers.

The teacher distributes classroom employment positions on a regular basis, such as once an instructional week, either based upon employment applications submitted by the children, on a random or other teacher-selected basis, based on a show of hands, or the like. In advantageous embodiments, classroom employment positions are assigned based upon a random drawing, such as by randomly drawing of sticks, such as popsicle sticks or tongue depressors, each individual stick containing a student's name or student identification number, from a cup or the like. As noted above, classroom employment positions are to be referred to utilizing authentic vocabulary. Several classroom employment positions are those traditionally present within classroom settings, such as classroom assistant(s), while many are reflective of the inventive behavioral and financial literacy system, such as attorney, banker and the like.

On a regular basis, such as once a week, the teacher pays students a classroom salary for their classroom employment utilizing classroom money for the jobs that they held in the classroom the week before. If a student is unemployed for any reason he/she will not be paid for his/her services the prior week. Students are paid a consistent weekly rate over the course of the school year, such as $10/week, if they had no behavior issues the week before. Students are paid a lesser consistent weekly rate, such as half the normal pay, e.g. $5/week, if they had any behavior issues the week before such that the students name was moved to a "worse" category on the behavior modification chart. Students are paid no salary if their names have been placed in the "Peer Court" category on the behavior modification chart for behavior infractions the week before.

Students pay taxes from their classroom salary each week, such as 20% or so of their weekly salary, for the use of classroom materials for the week. Such taxes may be collected by the teacher or an assigned student tax-collector. The teacher or student tax-collector may collect the taxes within any suitable container, such as a bag having "Tax Bag" printed on its face. This classroom money is then put aside to fund aspects of the inventive system, such as non-profit student organizations and the like.

Students also either pay rent from their classroom salary each week or they purchase their personal areas within the classroom. Rent is typically about 20% of the child's weekly salary. Personal areas for rent or sale within the classroom include desks and/or cubbies. Rent is only to be collected from students who do not own their personal area. The rent is collected either by the teacher or assigned rent-collection student by placing the classroom money obtained from the each renting student into a suitable container, such as a bag having "Rent Bag" printed on its face or the like.

The teacher gives students the opportunity to purchase their personal areas and become a member of the "Classroom Homeowners' Association" at his or her discretion, preferably several times a year. Personal areas, also referred to herein as "homes," are generally sold for about 10 times the classroom salary. The price of personal areas may be decreased over the course of the year, at the teacher's discretion. For example, the price of personal area at the beginning of the year may be 10 times the classroom salary, while the price of the same personal area may fall to 5 times the classroom salary after the winter holidays. Personal area prices may also fluctuate throughout the year depending on the economy. Students who chose to purchase their personal area receive a payment verification certificate to be attached to the front of their desks. The payment verification certificate states that the student's desk and cubby have been paid for and rent will no longer be collected from the student. This document will be placed on the purchaser's desk so that rent will not be collected from the "homeowner" during rent collection time.

The teacher provides an opportunity several times a year for students to apply for a classroom credit card, based upon a credit card application. The credit card application typically includes questions pertaining to the amount of classroom money that the student has, as well as whether they would rather save or spend. The teacher reviews the classroom credit card application and determines whether to approve the student based on savings vs. spending habits and the amount of classroom money currently in the student's possession. If students have over one weeks classroom salary and don't circle "I like to spend more than save" on the credit card application then they may be approved for credit, for example. Conversely, if they have under one weeks classroom salary and/or circle "I like to spend more than save" on the credit card application, then the student is typically not yet be ready for credit. Teachers should allow students to reapply for credit at a later date, if denied initially.

If approved for credit, the teacher provide the student(s) with a classroom credit card and associated classroom credit card limit. The credit card limit may either be a set limit for the entire class; however, in preferred embodiment, the student's credit card limit is set individually as a reflection of that student's cash on hand. Non-limiting credit card limits may range from 10% to 100% of the individual student's cash on hand, particularly from about 25 to 50% of the individual student's cash on hand. Classroom credit card transactions are tracked by the teacher within a transactions book. The teacher collects classroom credit card balances at predefined periods, such as at the end of each instructional week or month, by calling out each student's name or student ID number. Students who are unable to pay the full balance of their classroom credit cards at the end of the period will accrue a classroom finance fee, for example 50% of the weekly classroom salary, and classroom interest fee, for example 10% of the weekly classroom salary. The teacher adds this classroom finance fee and classroom interest fee to the student's ongoing credit card balance due at the end of the next period.

The instructional supervisor similarly provides students with the opportunity to open a classroom checking account. Students who choose to open a classroom checking account fill out an application to open an account. In contrast to the classroom credit card, the teacher approves any student who wishes to open a checking account and has classroom money to place in the account. Students earn interest based upon the balance left in the account at the end of the month. The specific interest earned may be at the teachers discretion, with an exemplary interest rate being about 2%. Checking account transactions, including monthly interest, are likewise tracked by the teacher within the bank transactions book, which is preferably the same book in which the credit card transactions are tracked. The teacher provides several free checks, such as two free checks, and a debit card to the student to allow student access to their classroom checking account when the account is opened, along with a student-bank ledger and at least one student-deposit slip. Additional checks may be purchased for a fee, such as 10% of the classroom salary per check. Students may withdraw money from their classroom checking account at any time deemed appropriate by the teacher, either by writing a check or a debit card withdrawal. Classroom debit card transactions and classroom checks are approved only in the event that the student has the requested amount of the money in his/her classroom checking account. The teacher keeps track of classroom debit card withdrawals, such as by journal entry within the bank transaction book, to ensure that students have the amount of money in their accounts that they are requesting to withdraw through classroom debit card purchases or check withdrawals.

The teacher creates a number of fines and fees, preferably posted in the classroom on a poster or the like, to deter undesirable student behaviors within the classroom or school. Non-limiting exemplary fines and associated exemplary fees include: fee for copies of lost forms or homework =2.5 times the weekly classroom salary; fee for missing name on paper=2 times the weekly classroom salary; fee for trespassing on teacher's property=2 times the weekly salary; fee for snack=1 times the weekly classroom salary; fee for shoe tying=⅕ the weekly salary; fee for skipping test questions=½ the weekly classroom salary per question; fee for non-emergency trip to the nurse's office=½ the weekly classroom salary per trip (or ⅕ weekly classroom salary if student has purchased health insurance); fee for overly messy desk=one weeks classroom salary (or $½^{th}$ the weekly classroom salary if the student has purchased property insurance). Non-punitive fees may also be levied, particularly fees associated with student-businesses, such as a fee for student-business commericals=½ the weekly classroom salary, a fee for a student-business auction=½ the weekly classroom salary; a fee for student-business advertisements on the classroom walls=$⅕^{th}$ the weekly classroom salary. If fines and fees cannot be paid, the student responsible for the fines and fees will go into debt until they pay them to the teacher.

The teacher sets up a classroom store at the beginning of the school year where students may shop using their classroom money. Non-limiting exemplary items for sale in the classroom store include specialty pencils, specialty erasers, and the like. In advantageous embodiments, all purchases are made for the person purchasing the item to ensure that purchases are rewards for having money as a result of good behavior in the classroom. The classroom store is open on a regular basis, such as at least once a week for at least 15 minutes, so that students can begin to make consumer decisions with the classroom money that they have earned. In preferred embodiments, the classroom store is open for at least a month prior to students opening their own stores to give students time to develop good shopping skills.

The teacher may also auction off items from the classroom store at her discretion. The auction increases students' awareness of value and worth, as well as motivates students who cannot afford such items to improve behavior and earn more money for the future.

In preferred embodiments, the teacher hold class lotteries (also referred to as raffles). The teacher particularly issues classroom lottery tickets to particular students for lottery drawings to be held at predetermined times. The lottery tickets within a given lottery may either be sold for classroom money or to incentivize student's performance, such as to encourage students to provide correct answers, achieve high test scores, or engage in outstanding behavior, for example, lottery tickets may be distributed during test reviews by asking review questions only one time and then calling on a student to answer the question. If the students answers correctly, the teacher will give him/her a lottery ticket for a drawing that will occur after the review. If the student whom was called on was not listening and asks the instructional supervisor to repeat the question, he/she will be told that questions are only called out one time and the instructional supervisor will move on to the next student for an answer and a chance to obtain a lottery ticket. This increases good listening behaviors in the instructional environment. Lottery drawings may be held at any predetermined time announced by the teacher, such as at the end of a specific review or instructional week. Lottery payouts may include one or more items from the classroom store or a predetermined amount of classroom money. Teachers are encouraged to discuss probabilities and statistics in association with one or more of the class lotteries.

The teacher also issues classroom stocks or classroom bonds at his/her discretion, in the form of a "stocks and bonds" game, preferably at predefined intervals. Students may purchase an opportunity to play the "stocks and bonds" game or the teacher may select one or more students to play the game either randomly or as a reward for good behavior or the like. For example, the teacher may utilize the "stocks and bonds" game during reviews in which he/she is not utilizing classroom lottery tickets. Specifically, if playing "stocks and bonds" during a review, the teacher will ask a review question only once and then call on a student. If the student whose name was called heard the question then he/she can answer for a chance to play "stocks and bonds". If the student does not hear the question the first time that it was asked, or he/she is unable to give an answer, then that student does not receive a chance to play "stocks and bonds." Students playing "stocks and bonds" are invited to draw a card from either a deck of "stock" cards or a deck of "bond" cards, each of which indicates that the student will either receive or pay a given amount of classroom money. The teacher initially asks the student if they would like either a stock or a bond, and then allows the student to pick a random card from the deck of their choice. As is the case outside the classroom, each of the cards within the "Stock" deck runs a much higher risk of a student pulling something great or pulling something unpleasant from that deck. For example, a student might pull a card that reads, "Win 2 times your weekly salary" or he/she might pull a card that says "Pay 2 times your weekly salary" from that deck. Conversely, the "bonds" deck runs a much lower risk. For example, a student might pull a card that says, "Win half a week of classroom salary" or he/she might pull a card that says "Pay a third of your weekly salary". The student playing the "stocks and bonds" game is then either paid in classroom money or pays the teacher the required amount, depending upon the instructions on the selected card.

The teacher periodically interjects "Life Happens" situations into the instructional day by stating, "Life just happened." Then a good or bad life-like scenario resulting in the payment or receipt of a given amount of classroom money to the selected student is announced by the instructional supervisor, and a random student name is selected from an envelope or the like. Alternatively, a student is selected by the teacher from the class, either randomly or by a show of hands or the like, and the student pulls a card from a deck of "life happens" cards that are each randomly printed on one side with either a good or bad scenario. The student would not be allowed to see the printed scenario as he/she picks the card. Non-limiting exemplary bad scenarios include "your child needs $5 for a field trip"; "a tree tell on your cubby and it takes $10 to repair it" or "you wrecked your car and its takes $5 to fix it." Non-limiting good scenarios include "your grandmother sent you $10" or "you found a treasure chest containing $50." The selected student is responsible for either paying the fee or collecting the winnings from the "life happens" scenario. The selected student may apply any applicable insurance he/she may have purchased to pay the fee, as well, as discussed in greater detail below. Selected students who do not have the savings to pay the fee must go into debt and pay when possible The teacher optionally provides students the opportunity to purchase health, property, and/or car insurance for the classroom. Students lessen financial risk in the classroom by purchasing classroom insurance when, for example, they incur a fine for making a non-emergency trip to the nurse's office (which would be covered under health insurance), a fine tor a messy desk (which would be covered under property insurance) and/or during "Life Happens" scenarios (which would be covered under health, property and/or car insurance). Insurance is advantageously paid via an upfront fee, such as one weeks classroom salary per type of insurance. The insurance component of the inventive system may further optionally include a deductible. For example, there may be a deductible of 1.5 times the weekly classroom salary for "Life Happens" scenarios and a deductible of 20% of the weekly classroom salary for classroom necessity events. The teacher may either issue stickers (indicating, as appropriate purchase of car, property and/or health insurance) to be placed on the back (second side) of the Student ID card in the "insurance area" to the students who purchase insurance and/or keep a record of the same within the Bank Transaction book. In alternative embodiments, the teacher may issue individual insurance cards. The teacher typically encourages students to place their Insurance Cards in their student wallet so that they may be presented during the school year as-needed to reduce fees levied or the like.

The teacher may optionally provide an opportunity for students to donate to peers whose names (or student identification numbers) are placed on a Debt Board. In preferred embodiments, the teacher generally posts a Debt Board within the classroom listing the student's name (or ID number) and associated outstanding debts, which the teacher (or assigned student) updates on a regular basis, such as the end of each school week. Donations should be be given directly to the teacher, not the individual students. In beneficial embodiments, students who receive donations are required to thank the donor(s) with a formal thank you note.

The may also optionally facilitate the student's selection and formation of a classroom non-profit organization run for the benefit of all students that is run with classroom tax dollars. Non-limiting exemplary non-profit organizations include "Manners School" in which students converse with their less well-behaved peers concerning ways to make good choices, thereby avoiding Peer Court, behavioral fines, and the like.

Once students have developed a sense of financial responsibility, they may begin opening their own student businesses in the classroom, particularly student run stores. Such student businesses provide students with an opportunity to earn classroom money in addition to their weekly classroom salary. Students may either procure items outside the classroom for resale in their stores or make items for sale in the classroom. Non-limiting exemplary items that the students may sell within their stores include decorated pencils, erasers, friendship bracelets, stress balls, student made cards, student written books, a rock shop (including rocks collected from school and home), snack shop, student newspaper and the like. Students may alternatively open a business to provide services for sale in the classroom. Non-limiting exemplary services that may be provide by the student businesses include face painting, hair braiding, manicures, dance lessons, storytelling and the like. The student business owners determine the sales price for their goods or services, and make change or charge the credit or debit cards of student consumers. The teacher should encourage the students to reflect upon their talents and positive things that they can offer others. Student businesses provide a protected venue for children to experiment in a free market economy. Successful student businesses provide strong validation (well beyond classroom profits) to the student business-owners and student-employees, particularly enriching the lives of at-risk students for whom such validation is rarely received.

Students who wish to open their own stores or businesses will present their classroom business plans, including a description of the item or service for sale and estimated profitability of the business. In advantageous embodiments, the student business owners have a waiver signed by their parents to ensure that that the parents are aware of the items sold and/or services provided. A classroom business license may be purchased once a business plan has been approved by the teacher. Students will be charged a classroom fee for the license. If students are caught selling items without a business license, they will pay a fine for selling without a license. Students who require extra space within the learning environment for their classroom stores or businesses may lease classroom property from the teacher, advantageously by executing a lease agreement. Students are encouraged to display signs within their student businesses to advise classroom consumers of any store policies, for example "No Refund" policies and the like. Students' classroom businesses may chose to pay classroom money for advertising space in the classroom. Students are encouraged to create advertising, including commercials and the like, to market their businesses. Students may also choose to pay classroom money for auction time at the front of the classroom.

The student businesses are open on a regular basis, such as at least once a week for at least fifteen minutes up to about an hour, so that students can practice their entrepreneurial skills. In advantageous embodiments, the student business are open at the same time as the classroom store. The teacher (or assigned tax collector) collects student-business taxes at the end of each business session, such as by placing the collected taxes in a Tax Bag. The business tax is generally a relatively small percentage of the revenue, such as 10% of the student's revenue. Students begin by adding up revenue from that particular session, and they then calculate the taxes due on that revenue, preferably using a student-business tax form. To make everything flow smoothly, students advantageously round that calculation to the closest dollar to pay their tax. Students who do not run a business may choose to become employees of a student business. All salaries are agreed upon between the student business manager (i.e. business owner) and the employee. It is up to the employee to show responsibility in his/her job and to collect the agreed upon salary. The teacher is to intervene only when a serious issues occur that the teacher determines cannot be worked out between the student employee and student employer.

Students are encouraged to apply for a trademark, copyright, and/or patent to protect their classroom business ideas in the learning environment. The instructional supervisor will provide an Invention Protection Application. Student business owners complete the application, and pay the corresponding fee(s). The teacher will determine students' approval status based on whether or not other students have publically created or used the same ideas in the classroom. If this is a new and different idea, the application may be approved and the student may place the corresponding protective symbol on his/her work. The fee(s) paid at the time of application are not refunded. If students "steal" ideas from another student after the ideas are protected, the alleged infringer is subject to a fine, such as 10 times their classroom salary, and/or may be subject to a classroom court trial. The invention protection element within the inventive learning system exposes students to the challenges involved in business.

The teacher may also optionally guide students in creating classroom wills to determine which classmates will receive their classroom belongings; including, but not limited to, wallets with classroom cash, classroom bank accounts, items in desks and cubbies, classroom businesses, etc. These classroom wills assign belongings in the event of a student leaving the classroom. This exposes students to the importance of a will, as required by national and state financial literacy standards.

The instructional supervisor will facilitate the election and creation of a classroom government that mimics an authentic representative government. Students will elect a Governor, Lieutenant Governor, a number of Senators (such as 3) and number of House of Representatives Members (such as 2) to create a classroom General Assembly. Classroom elections will also include an Attorney General and a Mayor that will meet with the General Assembly on a regular basis, such as once each month. Students will register and qualify to run for office prior based upon a campaign application and are allowed to campaign for a set amount of time, such as a week. The candidates should have a letter signed by a parent authorizing the child to participate in the campaign and subsequent classroom government. Students complete a voter-registration form, preferably upon showing the teacher a classroom identification badge or student identification issued to each student at the beginning of the instructional period. Campaigning will include the creation of persuasive campaign materials, developing a plan for improvement of the classroom, giving a speech, and answering questions within the learning environment. Student voters within the classroom will elect each of the positions via a voting ballot, preferably via an anonymous voting method. Upon election, the classroom government will make changes to benefit the learning environment with the guidance of the teacher. The classroom government will represent the classroom as a whole during meetings held in the learning environment periodically, such as once a month during recess. The class government will create classroom laws and work to solve issues within the classroom as needed. In advantageous embodiments, the students and/or teacher may impeach a member of the classroom government for non-performance of their duties and the like, with the resulting vacancy being filled via a special-election. A student may present a student grievance to the classroom government; and the teacher will subsequently facilitate the implementation of the governing body's response to the student grievance.

In expedient embodiments of the inventive instructional system, students set a measurable goal in the classroom on a periodic basis, such as at the beginning of each instructional week. The student writes their name and the goal on a piece of paper, such as a sticky note, and then places the goal under the appropriate discipline on a wall chart or goal setting template entitled "What's Your Goal?" The "What's Your Goal?" wall chart is broken down into several academic disciplines, such as Spelling, Reading, Writing, Math, Science, Social Studies, Related Arts, Special Area and Social, which are listed on cards below the title card. Each instructional period, the students will take down their personal goal from the previous week and decide on their own if they met the goal or not. If they did, they will get in line to tell the teacher what their goal was, how they met it, and get a high-five from the instructional supervisor. Students will then discard the old goal, get a new piece of paper, write their name and a new goal, and place it under the appropriate discipline on the "What's Your Goal?" chart. If a goal was not met, the student will discard the old goal, get a new piece of paper, write their name and a new goal, and place it under the appropriate on the "What's Your Goal?" chart.

To encourage caregiving skills, the teacher may optionally introduce a stuffed-animal class pet and the pet's diary into the classroom. Each day a student is chosen by his/her peer to take the class pet, along with the pet's diary, home. While at home, the student writes in the pet's diary about what they did together. The next instructional morning, the student brings the pet and pet's diary back to school and reads the diary entry to the class. Students then interview the pet's caretaker about what was read. The pet's caretaker then chooses a new student to become the class pet's caretaker for the next instructional day.

To encourage independent study, the teacher may optionally assign self-directed research projects, referred to as "College Prep Homework" to the students on a regular basis, such as one day a week. In the self-directed research projects, the students research something educational of their own choosing and write several paragraphs, such as about 2 paragraphs, about what they learned. In advantageous embodiments, no other homework is assigned on the night of College Prep Homework.

The inventive kits further provide financial literacy assessments, in the form of a printed questionnaire. Teachers are encouraged to give the assessments several times a year to determine the efficacy of the inventive methods. Non-limiting exemplary questions for incorporation within the assessment include: what does it mean to rent your home; what are income taxes; what is insurance; what is a credit card; what is a debit card; why is it important to have a bank account; what is the most important thing that you can use your money for; what is a want verus a need; what does it mean to budget; why should you save money; if you do not pay your credit card bill when it is due what will happen; what is the probability of winning the lottery; what is the difference between a stock and a bond; what is interest. The inventive kits further advantageously include "needs versus wants" cards in which two items are compared, such as "candy" (a want) versus "healthy food" (a need).

This invention provides relevancy and purposeful learning for students by immersion-role-playing based upon realistic and authentic experiences within learning environment. The life lessons learned become a common thread linking core academic subject areas including, but not limited to, math, writing, reading, and social studies. Students develop personal responsibility as expectations are raised and authentic learning is created and maintained. This total-immersion system allows students to grow at their own pace as they challenge themselves to develop strategies for successfully conquering the world that we live and work in each and every day. Natural differentiation begins to occur in the learning environment over time as gifted students challenge themselves to grow and prosper in the economy and unmotivated students begin to understand for themselves why learning is so important to their futures. The motivational force behind this system creates a fun and meaningful journey for students and teachers.

Through this invention, teachers are given the opportunity to create rich and relevant learning opportunities for students. Students will use math on a personal level, just as adults do as adults, when counting their money, making change for customers, figuring the probability of winning the lottery, determining the worth of insurance and investments. Writing will become purposeful as students write to inform others about their businesses through advertisements and write to persuade others when creating commercials for their classmates. Reading and technology will become a vital part of market research and advertising for students. And social studies will come alive through economics. Students will begin to see why historical decisions were made as leaders fought for money and power. Lastly, but possibly most importantly, life skills will be built within the learning environment each and every day. Students will gain money management and smart shopping skills, an understanding of employment and entrepreneurship, begin to make purposeful decisions, and take personal responsibility in their learning.

This invention seeks to help instructional supervisors easily sell students on learning throughout a standards-based curriculum and create personal student responsibility in the learning environment.

It will be understood that each of the elements described above, or two or more together may also find a useful application in other types of methods differing from the type described above. Accordingly, while the present invention has been described herein in detail in relation to its exemplary embodiments, it is to be understood that this disclosure is only illustrative and exemplary of the present and invention and is made merely for the purposes of providing a full and enabling disclosure of the invention. The foregoing disclosure is not intended to be construed or to limit the present invention or otherwise to exclude any other such embodiments, adaptations, variations, modifications, and equivalent arrangements. It will also be readily understood by those persons skilled in the art that the present invention is susceptible to broad utility and application. Many embodiments and adaptations of the system and method of the present invention other and those herein described, as well as many variations, modifications and equivalent arrangements, will be apparent from or reasonably suggested by the present invention and foregoing description thereof, without departing from the substance and scope of the invention.

That which is claimed:

1. A kit comprising
   (a) student wallets
   (b) a set of class money;
   (c) a motivational behavior chart system comprising
       (i) a plurality of behavior management cards and
       (ii) individual student-behavior cards,
   (d) a classroom banking system comprising
       (i) bank account applications
       (ii) bank transaction book
       (iii) student debit cards;
       (iv) student checks;
       (v) student deposit slips;
       (vi) student account ledgers
       (vii) credit card application;
       (viii) student credit cards;
   (e) stocks and bonds game comprising
       (i) a deck of cards containing stock scenarios and
       (ii) a deck of cards containing bond scenarios;
   (f) a system reflecting adult financial obligations comprising
       (i) a bag for collecting taxes;
       (ii) a bag for collecting rent;
       (iii) personal space ownership forms;
       (iv) a deck of "life happens" scenario cards;
       (v) student-business plan forms;
       (vi) wills and testaments;
       (vii) student business license forms; and
       (viii) student-business tax forms.

2. A kit according to claim 1, said kit further comprising one or more of
   (g) student insurance stickers;

(h) lottery tickets;
(i) flat sticks on which individual student names are written;
(j) student identification cards;
(k) student insurance stickers;
(l) notepad;
(m) peer court letter;
(n) student employment application;
(o) voter registration form;
(p) goal setting template;
(q) invention protection application;
(r) needs vs. wants cards;
(s) job cards for transient classes;
(t) financial knowledge assessment;
(u) college prep homework contract;
(v) voting ballot;
(w) candidate parent letter and campaign application;
(x) weekly reward schedule;
(y) tracking system sheet for behavior record keeping;
(z) stuffed animal as class pet;
(aa) diary for class pet;
(bb) goal setting subject area cards selected from one or more subject areas consisting of reading, writing, spelling, math, science, social studies, special area, related arts and social;
(cc) fines and fees poster;
(dd) classroom rules and procedures contract;
(ee) teacher's guide for classroom implementation; and
(ff) training video.

3. A kit as claimed in claim 1, wherein said kit further comprises
(gg) an employment board comprising
(i) classroom-employment labels; and
(ii) individual student-employment cards.

* * * * *